United States Patent [19]

Corletti et al.

[11] Patent Number: 5,271,051
[45] Date of Patent: Dec. 14, 1993

[54] COMBINED COOLING AND PURIFICATION SYSTEM FOR NUCLEAR REACTOR SPENT FUEL PIT, REFUELING CAVITY, AND REFUELING WATER STORAGE TANK

[75] Inventors: Michael M. Corletti, New Kensington; Louis K. Lau, Monroeville; Terry L. Schulz, Murrysville Boro, all of Pa.

[73] Assignee: Westinghouse Electric Corp., Pittsburgh, Pa.

[21] Appl. No.: 903,632

[22] Filed: Jun. 24, 1992

[51] Int. Cl.$^5$ .............................................. G21C 19/32
[52] U.S. Cl. ................................... 376/298; 376/272; 376/313
[58] Field of Search ............... 376/264, 272, 282, 299, 376/310, 313, 298

[56] References Cited

U.S. PATENT DOCUMENTS

| | | | |
|---|---|---|---|
| 3,929,567 | 12/1975 | Schabert et al. | 376/282 |
| 4,138,319 | 2/1979 | Schabert et al. | 376/282 |
| 4,753,771 | 6/1988 | Conway et al. | 376/299 |
| 4,959,146 | 9/1990 | Kristan | 376/310 |

FOREIGN PATENT DOCUMENTS

| | | | |
|---|---|---|---|
| 54-148994 | 11/1979 | Japan | 376/313 |
| 54-162094 | 12/1979 | Japan | 376/310 |
| 62-90598 | 4/1987 | Japan | 376/313 |
| 64-54399 | 3/1989 | Japan | 376/313 |

*Primary Examiner*—Daniel D. Wasil
*Attorney, Agent, or Firm*—J. C. Valentine

[57] ABSTRACT

The spent fuel pit of a pressured water reactor (PWR) nuclear power plant has sufficient coolant capacity that a safety rated cooling system is not required. A non-safety rated combined cooling and purification system with redundant branches selectively provides simultaneously cooling and purification for the spent fuel pit, the refueling cavity, and the refueling water storage tank, and transfers coolant from the refueling water storage tank to the refueling cavity without it passing through the reactor core. Skimmers on the suction piping of the combined cooling and purification system eliminate the need for separate skimmer circuits with dedicated pumps.

10 Claims, 1 Drawing Sheet

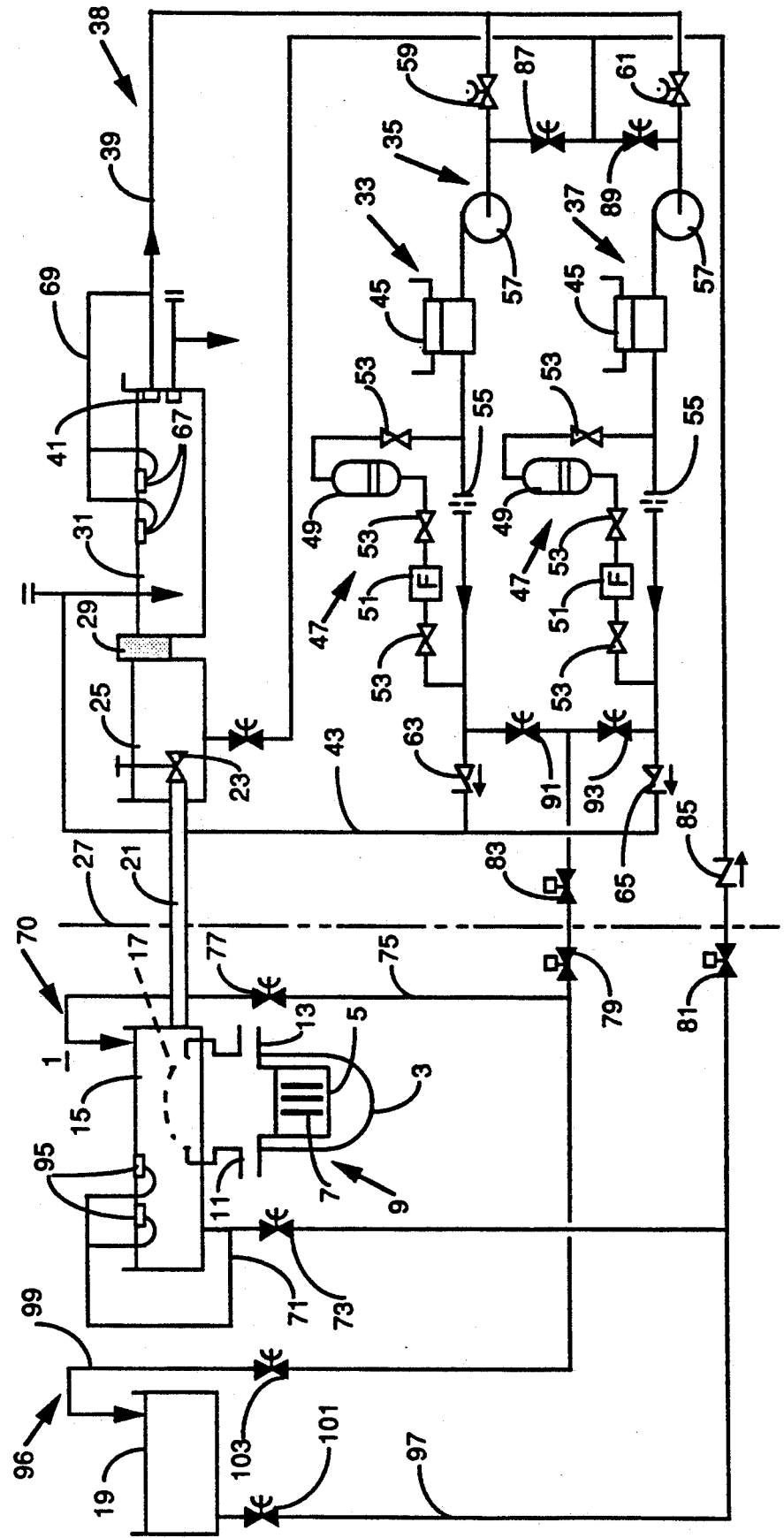

COMBINED COOLING AND PURIFICATION SYSTEM FOR NUCLEAR REACTOR SPENT FUEL PIT, REFUELING CAVITY, AND REFUELING WATER STORAGE TANK

GOVERNMENT CONTRACT

The Government of the United States of America has rights in this invention pursuant to Contract No. DE-AC03-90SF18495 awarded by the Department of Energy.

BACKGROUND OF THE INVENTION

1. Field of the Invention

This invention relates to pressurized water reactor nuclear power plants, and more particularly to systems for cooling and purifying coolant in the spent fuel pit, refueling cavity and refueling water storage tank, and for transferring coolant between these components.

2. Background Information

In pressurized water reactor nuclear power plants, coolant in the form of light water is passed through fuel assemblies in a reactor core housed in a reactor vessel. The coolant is circulated in a primary loop between the reactor core and a steam generator which utilizes the heat removed from the reactor core by the coolant in the primary loop to generate steam in a secondary loop which drives a turbine generator to produce electricity.

Periodically, the reactor core must be refueled. This is accomplished by flooding a refueling cavity over the reactor vessel with coolant from a refueling water storage tank. The fuel assemblies to be replaced are lifted from the reactor core into the refueling cavity and, while remaining immersed in coolant, are conveyed through a transfer tube and a fuel transfer canal to a spent fuel pit outside containment for on-site storage. A spent fuel pit cooling system removes decay heat released by the stored fuel assemblies. The cooling system pumps coolant from the spent fuel pit through heat exchangers which dump the decay heat to a component cooling water system. The current spent fuel pit cooling systems are required by regulation to be safety grade and that includes energization of the cooling system pumps by a safety grade bus. In order to meet these requirements, two completely separate spent fuel pit cooling systems are provided.

During refueling operations, the operator manipulates a refueling machine by visual observation of the fuel assemblies through the coolant. The operators ability to do so is dependent on the clarity of the coolant. Presently, the refueling cavity is flooded with coolant from the refueling water storage tank through the reactor core. Debris and sediment dislodged from the core leads to poor clarity of the coolant in the refueling cavity. Often auxiliary purification equipment in the form of filters, dimineralizers and skimmers must be brought in to improve coolant clarity during refueling.

Clarity can also be a problem in the spent fuel pit. Presently separate purification systems, independent of the spent fuel pit cooling system, are used to improve the clarity of the coolant in the spent fuel pit. Separate skimmers are also used to remove foreign matter from the surface of the spent fuel pit.

All of these separate, and in some cases redundant, cooling and purification systems require a great deal of equipment including six or seven pumps some of which must be safety grade.

SUMMARY OF THE INVENTION

It is the primary object of the invention to provide improved apparatus for cooling and purifying coolant in the spent fuel pit, refueling cavity, and refueling water storage tank in a pressurized water reactor nuclear power plant.

It is a further object of the invention to provide such apparatus which does not have to be qualified as safety grade.

It is also an object of the invention to reduce the need for purification of coolant in the refueling cavity.

It is a more particular object of the invention to reduce the need for purification of refueling cavity coolant by transferring coolant from the refueling water storage tank to the refueling cavity without it passing through the reactor core.

It is an additional object of the invention to reduce the total equipment needed to perform all the required cooling and purification functions.

These and other objects are realized by the invention which is directed to improvements in a nuclear reactor which include a spent fuel pit having a capacity to absorb decay heat from a specified number of fuel assemblies stored in the pit for the time interval required by regulation without the need for electric power so that the spent fuel pit cooling system does not have to be safety grade.

As another aspect of the invention, non-safety rated spent fuel pit cooling means is connected in series with the purification means to form a combined cooling and purification system having a common non-safety rated pump. This combined cooling and purification system simultaneously cools and purifies spent fuel pit coolant in a single loop. Preferably, the single loop has two branches, each with cooling means such as a heat exchanger and purification means such as a demineralizer and filters and its own non-safety rated pump. Coolant is drawn from the spent fuel pit by each branch of the combined cooling and purification system through common suction piping and is discharged back into the spent fuel pit through common discharge piping. The skimmer means is connected to the common suction piping, thereby eliminating the need for a separate skimmer circuit.

The invention further includes cooling and purifying coolant in the refueling cavity by circulating it through the combined cooling and purification system. This eliminates the need to bring in additional cooling and purification equipment during refueling.

As another aspect of the invention, the combined cooling and purification system is used to transfer coolant between the refueling water storage tank and the refueling cavity without the coolant passing through the reactor core. This improves the clarity of the coolant in the refueling cavity as the debris and sediment in the core is not flushed into the refueling cavity as is currently the case. The clarity of the water in the refueling cavity can be further improved, by prior to refueling, circulating the refueling water storage tank coolant through the combined cooling and purification system.

The invention is directed to both the apparatus and method related to the above improvements in a pressurized water reactor nuclear power plant.

BRIEF DESCRIPTION OF THE DRAWINGS

A full understanding of the invention can be gained from the following description of the preferred embodiments when read in conjunction with the accompanying drawings which schematically illustrates the relevant components of a pressurized water reactor nuclear power plant incorporating the invention.

DESCRIPTION OF THE PREFERRED EMBODIMENTS

The components of a pressurized water reactor (PWR) nuclear power plant relevant to the present invention are illustrated schematically in the figure. The PWR 1 includes a reactor vessel 3 having a core 5 containing a matrix of fuel assemblies 7. The reactor coolant system 9 includes a hot leg 11 connected to the primary side of steam generator(s) (not shown), a cold leg 13 also connected to the steam generator and pumps (also not shown) which circulate coolant in the form of light water through the reactor core 5 over the fuel assemblies 7, through the hot leg 11 to the steam generator(s) and back through the cold leg 13. Heat generated by fission of the fuel in the fuel assemblies 7 heats the coolant which is used by the steam generator to generate steam in a secondary loop to drive a turbine generator (also not shown).

Periodically, the reactor core 5 is refueled by filling a refueling cavity 15 surrounding the head 17 of the reactor vessel with coolant from an in containment refueling water storage tank 19. During refueling, the head 17 is removed from the reactor vessel 3 and the fuel assemblies 7 to be replaced are raised by a refueling machine (not shown) into the refueling cavity 15 where they remain submerged in coolant. The removed fuel assemblies 7 are rotated to a horizontal position and passed through a fuel transfer tube having a normally open manual valve 23 to a fuel transfer canal 25. The fuel transfer tube 21 passes through containment 27. All of the components to the left of 27 in the figure are in containment while all those to the right of 27 are outside of containment.

The spent fuel assemblies are conveyed through the fuel transfer canal 25 under coolant and passed through a normally open gate 29 into the spent fuel pit 31 where the spent fuel assemblies are stored under cover of coolant. Typically, the reactor 3 is refueled about every 18 months. During each refueling, about one third of the fuel assemblies are removed and transferred to the spent fuel pit. Typically, the spent fuel pit is designed to hold ten years worth of spent fuel assemblies.

The spent fuel pit 31 must have the capability of removing the decay heat from the stored spent fuel assemblies. It is also necessary to purify the coolant in the spent fuel pit to maintain good clarity so that the fuel assemblies can be observed. In accordance with the invention, a combined cooling and purification system 33 is provided to perform these functions simultaneously. A unique aspect of the invention is that the spent fuel pit 31 has a volume of coolant sufficient to absorb the decay heat from a full ten-year accumulation of spent fuel assemblies without operation of the combined cooling and purification system 33 for a period of time sufficient to permit remedial action. In the exemplary system, this is a period of at least 72 hours. This implements the new concept of passive safety systems for PWRs. By passive, it is meant that the system maintains the plant in a safe condition following a disturbance such as an accident, loss of power or an earthquake without intervention by an operator, and without the use of equipment that requires electrical power. Thus, in the case of the spent fuel pit, if the combined cooling and purification system should fail or lose power, the spent fuel pit will maintain in a safe condition for at least 72 hours in which restoration of the combined cooling and purification system can be accomplished or temporary cooling means can put into operation.

The combined cooling and purification system 33 includes two branches 35 and 37. The two branches 35 and 37 are served by first piping 38 including common suction piping 39 which draws coolant from the spent fuel pit 31 through an intake filter 41. Both branches 35 and 37 discharge coolant into the spent fuel pit 31 through common discharge piping 43.

Each of the branches 33 and 35 of the combined cooling and purification system 33 includes a heat exchanger 45. Heat removed from coolant passed through the primary side of the heat exchanger 45 is removed by component cooling water passed through the secondary.

The branches 35 and 37 of the combined cooling and purification system 33 also include purification apparatus 47 which includes a demineralizer 49 in series with a filter 51. Valves 53 can be used to isolate the demineralizer and filter. In parallel with the demineralizer 49 and filter 51 is an orifice 55 which sets the proportion of the flow through the branch which passes through the demineralizer and filter. In the exemplary system, about one third of the flow is purified and two thirds is bypassed by the orifice 55. Finally, each branch 35 and 37 includes a pump 57. As the spent fuel pit provides passive cooling of the spent fuel assemblies, the combined cooling and purification system 33 does not have to be safety rated, and thus the pumps do not have be powered by a safety rated bus. However, an auxiliary non-safety rated auxiliary power unit (not shown) can be provided for the pumps 57.

Manual valves 59 and 61 in the common suction piping 39 control flow of coolant from the spent fuel pit 31 to the branches 35 and 37, respectively, of the combined cooling and purification system 33. Similarly, stop valves 63 and 65 in the common discharge piping 43 control the flow of coolant from the branches 35 and 37, respectively, back to the spent fuel pit 31. Each of the branches 35 and 37 of the combined cooling and purification system have the capacity to provide the required cooling and purification for the spent fuel pit. The redundant branches, however, increase the availability of cooling and purification. Normally, the valves 59, 61, 63 and 65 for both branches are open, but only the pump 57 in a selected branch is run at any time. With these valves always open, transfer between the branches can be affected rapidly merely by switching active pumps 57.

The invention further includes providing skimmers 67 connected by a line 69 to the common suction piping 39 for removing surface debris from coolant in the spent fuel pit 31. This eliminates the current need for separate skimmer circuits with their own pumps.

As another aspect of the invention, the combined cooling and purification system 33 can also be used for cooling and purifying coolant in the refueling cavity 15. Thus, second piping 70 including suction piping 71 with isolation valves 73 and discharge piping 75 with isolation valves 77 connect the refueling cavity 15 in a loop with the combined cooling and purification system 33. Additional motor operated isolation valves 79 and 81 are provided inside reactor containment 27 and motor operated valve 83 and check valve 85 are provided outside a containment 27. The refueling cavity coolant is passed through one of the branches 35 and 37 of the combined cooling and purification system 33 by operation of the inlet valves 87 and 89 and outlet valves 91 and 93. By appropriate operation of the valves 59-65 and 87-93, one of the branches 35 and 37 of the combined cooling and purification system 33 can be connected to cool and purified coolant from the spent fuel pit 31 while the other branch is providing cooling and purification of coolant from the refueling cavity 15. Thus, the combined cooling and purification system 33 can be used as a supplement to, or in place of, the reactor heat removal system (RHR), previously used to cool refueling cavity coolant during refueling operations. The present invention removes the necessity for bringing in temporary equipment to clarify coolant in the refueling cavity 15. In addition, skimmers 95 are provided on the intakes of the suction piping 71 to remove surface debris from the coolant in the refueling cavity. Again, this eliminates the need to bring in temporary skimming equipment with a separate hydraulic circuit and pump.

It is also an aspect of the invention that the combined cooling and purification system 33 can be used to clarify the coolant in the refueling water storage tank 19. Thus, third piping 96 including suction piping 97 and discharge piping 99 with their respective selection valves 101 and 103 are used in connection with the valves 59-63 and 87-93 to selectively connect the refueling water storage tank 19 in a loop with one of the branches 35-37 of the combined cooling and purification system 33.

As another important aspect of the invention, the combined cooling and purification system 33 can be utilized to transfer coolant between the refueling water storage tank 19 and the refueling cavity 15 for refueling by opening valves 101 and 77 and closing valves 103 and 73. This effects a filling of the refueling cavity 15 with coolant from the refueling water storage tank 19 without having the coolant pass through the reactor core 5 as has been past practice. Thus, the coolant transferred to the refueling cavity 15 does not pick up debris and sediment from the reactor core 5. Furthermore, by passing through the purification apparatus 47, the clarity of the coolant delivered to the refueling cavity 15 is improved. In accordance with the invention, in the period prior to refueling, the coolant in the refueling water storage tank 19 is circulated through the combined cooling and purification system 33 to prepare it for refueling.

As can be appreciated from the above description, the invention offers many advantages. First, it provides passive spent fuel pit cooling. It also provides a spent fuel pit cooling system which does not have to be safety rated. It reduces the amount of apparatus required for spent fuel pit cooling and purification by combining these systems in a single loop which can have redundant branches for increased availability and for simultaneously cooling and purifying refueling cavity coolant and purifying refueling water storage tank coolant while cooling and purifying spent fuel pit cooling. The invention also eliminates the need for separate skimmer circuits for the spent fuel pit and the need for bringing into containment temporary clarification and skimmer apparatus for the refueling cavity. Another important advantage offered by the invention is that it permits transfer of coolant from the refueling water storage tank to the refueling cavity without the need for the coolant to pass through the reactor core, and even provides for improving the clarity of the coolant while it is being transferred to the refueling cavity.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a nuclear reactor comprising a reactor vessel having a reactor core fueled with fuel assemblies, a reactor coolant system circulating coolant through the reactor core, a refueling cavity through which fuel assemblies are inserted into and removed from the reactor core, a spent fuel pit in which fuel assemblies removed from the reactor core are stored under coolant, fuel transfer means through which fuel assemblies are transferred between said refueling cavity and said spent fuel pit under coolant, a refueling water storage tank containing a supply of coolant which fills said refueling cavity during refueling, spent fuel pit cooling means, skimmer means for skimming particulates from the coolant, and purification means for purifying said coolant, the improvement: wherein said spent fuel pit has a volume of coolant for removing decay heat from said fuel assemblies in said spent fuel pit without operation of said spent fuel pit cooling means; wherein said spent fuel pit cooling means is non-safety rated; and wherein said spent fuel pit cooling means and said purification means are connected in series to form a combined cooling and purification system having common non-safety rated pump means and first piping means for circulating coolant drawn from said spent fuel pit through said combined cooling and purification system and back to said spent fuel pit to simultaneously in a single loop cool and purify spent fuel pit coolant; and including second piping means for selectively circulating coolant drawn from said refueling cavity through said combined cooling and purification system and back to said refueling cavity to simultaneously cool and purify refueling coolant in said cavity.

2. The improvement of claim 1 wherein said skimmer means is connected to said first piping means through which coolant is drawn from said spent fuel pit by said common pump means for circulation through said combined cooling and purification system.

3. The improvement of claim 1 wherein said skimmer means is connected to said second piping means through which coolant is drawn from said refueling cavity by said common pump means for circulation through said combined cooling and purification system.

4. The improvement of claim 1 including third piping means disposed between said refueling water storage tank and said second piping means for circulating coolant from said refueling water storage tank through said combined cooling and purification system and back to said refueling water storage tank using said common pump means.

5. The improvement of claim 4 wherein said second piping means and said third piping means have valves for circulating coolant from said refueling water storage tank through said combined cooling and purification system and directly to said refueling cavity without passing through said reactor core using said common pump means.

6. The improvement of claim 1 including transfer means selectively transferring coolant between said refueling cavity and said refueling water storage tank through said combined cooling and purification system without passing through said reactor core using said common pump means.

7. The improvement of claim 1 wherein said combined cooling and purification system comprises parallel branches each having cooling means, purification means and a common pump, and wherein said first piping means comprises common suction pipe means drawing coolant from said spent fuel pit for both branches, and common discharge pipe means discharging coolant from both branches into said spent fuel pit.

8. The improvement of claim 1 wherein said cooling means comprises heat exchanger means.

9. The Improvement of claim 1 wherein said purification means comprises demineralizer means.

10. The improvement of claim 9 wherein said purification means further includes filter means.

* * * * *